(12) United States Patent
Kangas et al.

(10) Patent No.: US 7,648,066 B2
(45) Date of Patent: Jan. 19, 2010

(54) APPARATUS, SYSTEM, AND METHOD FOR SORTING PURCHASE ITEMS

(75) Inventors: Paul Daniel Kangas, Raleigh, NC (US); Robert Andrew Myers, Cary, NC (US); Jeff David Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 11/470,175

(22) Filed: Sep. 5, 2006

(65) Prior Publication Data

US 2008/0054071 A1 Mar. 6, 2008

(51) Int. Cl.
*G06K 15/00* (2006.01)

(52) U.S. Cl. .................. 235/383; 235/375; 235/376; 235/381; 705/16; 705/23; 209/509; 209/540; 209/541; 186/61; 186/66; 186/67

(58) Field of Classification Search .......... 235/381, 235/383, 375, 376; 705/16, 23; 209/509, 209/540, 541; 186/61, 66, 67
See application file for complete search history.

(56) References Cited

U.S. PATENT DOCUMENTS

| 2,560,490 | A | | 7/1951 | Smith et al. ............... 312/140.3 |
| 4,106,628 | A | * | 8/1978 | Warkentin et al. ........... 209/556 |
| 4,964,053 | A | * | 10/1990 | Humble ....................... 705/416 |
| 5,020,675 | A | | 6/1991 | Cowlin et al. ................ 209/538 |
| 5,167,301 | A | | 12/1992 | Cappi et al. .................... 186/66 |
| 5,551,531 | A | * | 9/1996 | Dumont ......................... 186/61 |
| 6,711,874 | B1 | * | 3/2004 | Nakagawa et al. ............. 53/64 |
| 7,255,271 | B2 | * | 8/2007 | Ulrich et al. ................. 235/383 |
| 2002/0008054 | A1 | | 1/2002 | Ruigrok et al. ............. 209/552 |
| 2003/0052166 | A1 | * | 3/2003 | Nguyen ....................... 235/383 |

* cited by examiner

*Primary Examiner*—Michael G Lee
*Assistant Examiner*—Ali Sharifzada
(74) *Attorney, Agent, or Firm*—Kunzler & McKenzie

(57) ABSTRACT

An apparatus, system, and method are disclosed for sorting purchase items. A selection module selects a plurality of categories. In one embodiment, the selection module receives a category selection. In addition, the selection module may receive a criterion selection for the category selection and receive a modification for the criterion selection. The selection module may further modify the criterion of the selected category with the modification. An identification module identifies a purchase item. An association module associates a selected category of the plurality of categories with the purchase item. A sorter sorts the purchase item to a specified bin. The specified bin is associated with the selected category. In one embodiment, a bagger may bag one or more purchase items from a bin.

20 Claims, 15 Drawing Sheets

APPARATUS, SYSTEM, AND METHOD FOR SORTING PURCHASE ITEMS

BACKGROUND OF THE INVENTION

1. Field of the Invention

This invention relates to sorting purchase items and more particularly relates to sorting purchase items for scan and bag self-checkout systems.

2. Description of the Related Art

Scan and bag self-checkout systems are often used to allow customers to pay for purchase items with little or no intervention from retail or store personnel. As used herein, scan and bag self-checkout systems are referred to as self-checkout systems. Self-checkout systems may allow a store to make more checkout stations available including the self-checkout systems using a small number of store personnel. In addition, store personnel may be more flexibly employed when self-checkout systems are used.

When using a self-checkout system, a customer typically brings purchase items to the self-checkout system and scans each purchase item using a bar code scanner, radio frequency identifier (RFID) scanner, or the like. The customer may then place the scanned purchase item in a bag. After scanning the purchase items, the customer pays for the purchase items using cash, debit cards, credit cards, and the like.

Unfortunately, the customer often does not scan purchase items in an optimum order for bagging purchase items. Verification devices that verify the bagging of scanned purchase items may also erroneously request that store personnel intervene and check the purchase items if a customer attempts to sort and/or arrange purchase items after the purchase items are scanned and initially bagged.

As a result, self-checkout systems may include a conveyer belt to move the scanned purchase items away from the scanning area after scanning. The customer may then sort and bag purchase items from the conveyer belt after scanning the purchase items, allowing the customer to sort and arrange the purchase items in the bags.

Unfortunately, other customers are typically unable to use the self-checkout system while the customer is bagging purchase items from the conveyer belt. As a result, the bagging customer may feel rushed and may fail to adequately sort the purchase items. The customer may then bag the purchase items in a way that can damage some of the items such as by bagging heavy purchase items with fragile purchase items.

Even if the customer properly sorts the purchase items for bagging, waiting customers may become impatient during the sorting. As a result, the waiting and the bagging customers' shopping experiences may be diminished and the customers may view self-checkout systems less favorable.

From the foregoing discussion, it should be apparent that a need exists for an apparatus, system, and method that sort purchase items at a self-checkout system. Beneficially, such an apparatus, system, and method would aid a customer in rapidly sorting the purchase items for bagging and transport.

SUMMARY OF THE INVENTION

The present invention has been developed in response to the present state of the art, and in particular, in response to the problems and needs in the art that have not yet been fully solved by currently available purchase item sorting methods. Accordingly, the present invention has been developed to provide an apparatus, system, and method for sorting purchase items that overcome many or all of the above-discussed shortcomings in the art.

The apparatus to sort purchase items is provided with a plurality of elements configured to functionally execute the steps of selecting a plurality of categories, identifying a purchase item, associating a selected category with the purchase item, and motivating the purchase item to a specified bin. These modules in the described embodiments include a selection module, an identification module, an association module, and a sorter.

The selection module selects a plurality of categories. In one embodiment, the selection module receives a user profile. The user profile may include a plurality of predetermined categories. The selection module may select the predetermined categories as the plurality of categories. In an alternate embodiment, the selection module selects a specified initial set of categories.

The identification module identifies a purchase item. In one embodiment, the identification module identifies the purchase item from an identifier of the purchase item. In a certain embodiment, the identifier is a radio frequency identifier (RFID). The identification module may identify the purchase item from an identifier code retrieved from the RFID identifier. The identifier may also be a bar code and the identification module may identify the purchase item from an identifier code scanned from the bar code.

The association module associates a selected category of the plurality of categories with the purchase item. In one embodiment, the each category includes one or more criteria. Each purchase item may also include one or more characteristics. The association module may match the characteristics of the purchase item with criteria of the selected category.

The sorter sorts the purchase item to a specified bin of a plurality of bins. The specified bin is associated with the selected category. In one embodiment, each category is associated with a bin. Each bin may be associated with one or more categories.

The sorter may include a conveyer that motivates the purchase item to the selected bin. In addition, the sorter may include a bin actuator. In one embodiment, the bins are disposed radially about a pivot and the bin actuator may rotate the bins about the pivot to position the specified bin to receive the purchase item from the conveyer.

In an alternate embodiment, an actuator diverts the purchase item from the conveyer to the specified bin. The bins may be disposed parallel to the conveyer. The apparatus sorts the purchase item to the specified bin, supporting more efficient bagging by a user of a self-checkout system.

A system of the present invention is also presented to sort purchase items. The system may be embodied in a self-checkout system. In particular, the system, in one embodiment, includes a scanner, a user terminal, a controller, a plurality of bins, and a sorter. The system may also include a bagger, The scanner scans an identifier of a purchase item. The scanner may be a bar code reader, an RFID reader, a vision system, and the like. In one embodiment, the scanner scans the identifier to retrieve an identifier code.

The user terminal interfaces with a user. In one embodiment, the user terminal receives user selections. The user terminal may also receive payments. In a certain embodiment, the user terminal includes a display for displaying the user selections. The display may be configured as a touch screen.

The controller includes a selection module, an identification module, and an association module. The selection module selects a plurality of categories. The identification module identifies the purchase item. In a certain embodiment, the identification module identifies the purchase item from the scanned identifier. The identification module may identify the purchase item from the identifier code retrieved from the scanned identifier. The association module associates a selected category of the plurality of categories with the purchase item.

The plurality of bins is configured to receive one or more purchase items. The bins may be disposed radially about a pivot. Alternatively, the bins may be disposed linearly. The sorter sorts the purchase item to a specified bin. The specified bin is associated with the selected category. The bagger may bag one or more purchase items from a bin. Alternatively, the user may bag the purchase items from each bin. The systems sorts each purchase item to a specified bin to facilitate the bagging and/or removal of the purchase items.

A method of the present invention is also presented for sorting purchase items. The method in the disclosed embodiments substantially includes the steps to carry out the functions presented above with respect to the operation of the described apparatus and system. In one embodiment, the method includes selecting a plurality of categories, identifying a purchase item, associating a selected category with the purchase item, and motivating the purchase item to a specified bin. The method also may include receiving a category selection, receiving a criterion selection for the category selection, receiving a modification for the criterion selection, modifying the criterion of the selected category, and bagging one or more purchase items from a bin.

A selection module selects a plurality of categories. In one embodiment, the selection module receives a category selection. In addition, the selection module may receive a criterion selection for the category selection and receive a modification for the criterion selection. The selection module may further modify the criterion of the selected category with the modification. An identification module identifies a purchase item. An association module associates a selected category with the purchase item. A sorter sorts the purchase item to a specified bin. The specified bin is associated with the selected category. In one embodiment, a bagger may bag one or more purchase items from a bin. The method sorts purchase items to specified bins to speed the removal and/or bagging of the purchase items.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention identifies a purchase item, associates the purchase item with a category, and sorts the purchase item to a bin associated with the category, wherein the bin is one of a plurality of bins. The embodiment of the present invention may also bag one or more purchase items from each bin. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
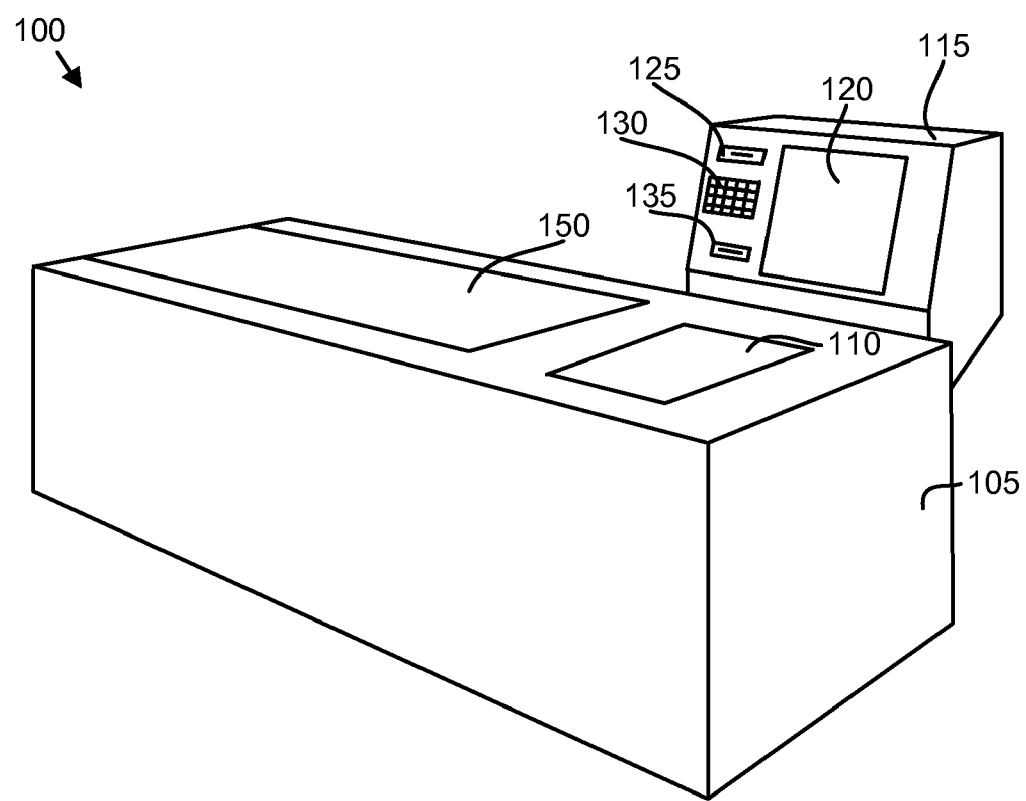
FIG. 1 is a perspective drawing illustrating one embodiment of a self-checkout system.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a perspective drawing illustrating one embodiment of a self-checkout system 100. The system 100 includes a platform 105, a user interface 115, a scanner 110, and a conveyer 150. The user interface 115 includes a display 120, a cash receptacle 125, a keypad 130, and a bankcard receptacle 135. The user interface 115 may also include additional elements for completing transactions with a user.

The user may place one or more purchase items on the conveyer 150. In addition, the user may remove each purchase item from the conveyer 150 and scan each purchase item with the scanner 110. The scanner 110 may be configured as a bar code scanner, a RFID scanner, and the like. In one embodiment, the scanner 110 is a vision system that captures visual characteristics of the purchase item.

The system 100 may calculate a total purchase cost for the purchase items and display the total purchase cost on the display 120. The user may accept the total purchase cost using a key of the keypad 130. Alternatively, the display 120 may be configured as a touch display and the user may accept the total purchase cost using a touch key of the display 120.

The user may complete the transaction by tendering a cash payment through the cash receptacle 125 and/or by tendering a bank card such as a credit card, a debit card, a cash card, a gift card, or the like at the bank card receptacle 135. The display 120 may also receive a user signature.

The present invention sorts the purchase items after the purchase items are scanned as will be described hereafter. In one embodiment, the present invention sorts the purchase items to facilitate bagging by the user and/or by a retail employee. In an alternate embodiment, the present invention sorts the purchase items for bagging by an automated bagger as will be described hereafter.

Figure 2:
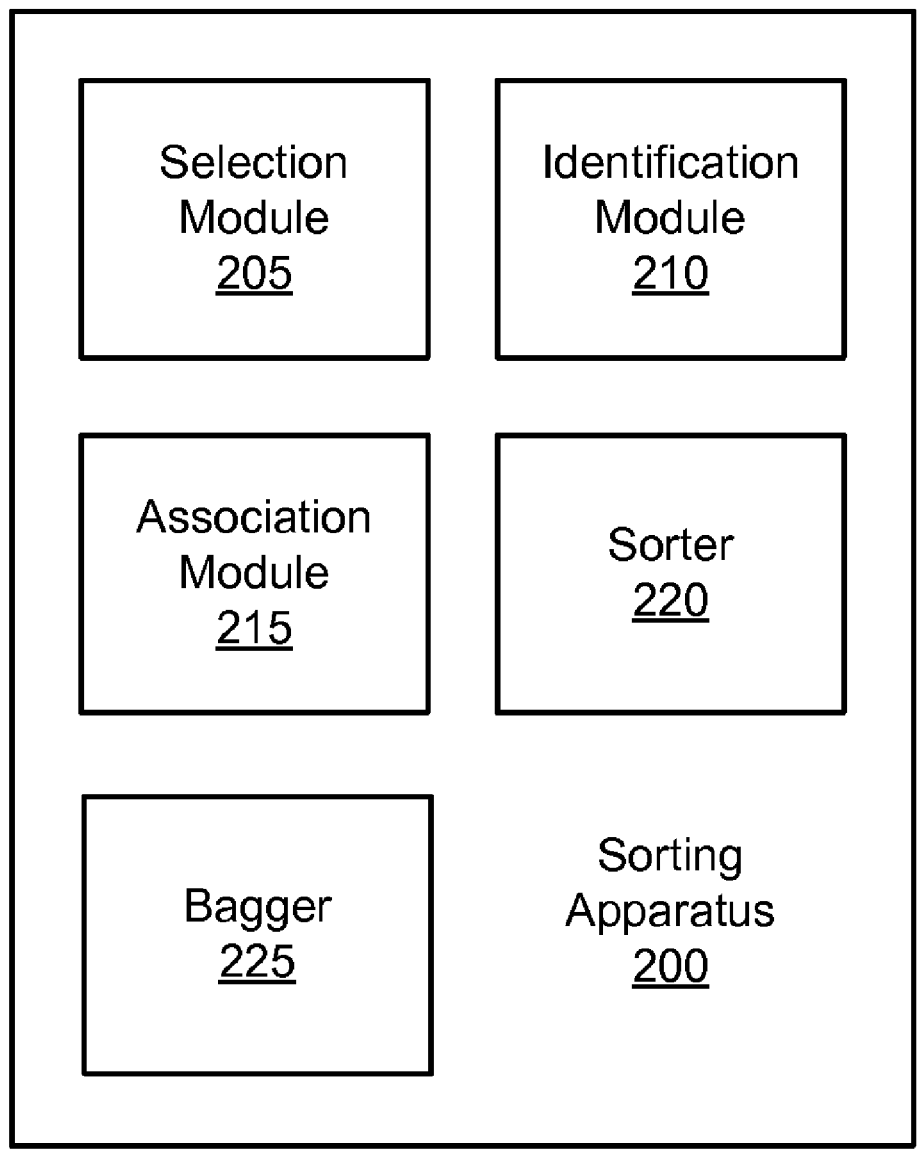
FIG. 2 is a schematic block diagram illustrating one embodiment of a sorting apparatus of the present invention.

FIG. 2 is a schematic block diagram illustrating one embodiment of a sorting apparatus 200 of the present invention. The apparatus 200 sorts one or more purchase items and may be embodied in the self-checkout system 100 of FIG. 1. The description of the apparatus 200 refers to elements of FIG. 1, like numbers referring to like elements. The apparatus 200 includes a selection module 205, an identification module 210, an association module 215, a sorter 220, and a bagger 225.

The selection module 205 selects a plurality of categories. In one embodiment, the selection module 205 selects a specified initial set of categories. For example, the selection module 205 may select an initial set of categories comprising the categories of fragile items, heavy items, liquid-expressing items, and light items.

Each category may include one or more criteria. For example, each category may include a criterion for weight, a criterion or liquid-expression, and the like. In addition each category may have a fragility criterion specifying minimum force that may cause damage to the purchase item. Table 1 illustrates one example of categories and criteria.

TABLE 1

| Category | Fragility Criterion | Weight Criterion | Volume Criterion | Liquid Expression Criterion |
|---|---|---|---|---|
| Fragile Items | <0.1 Newtons | <100 grams | <1000 cubic centimeters | No |
| Heavy Items | <10 Newtons | <5,000 grams | <5000 cubic centimeters | No |
| Liquid-expressing Items | <2 Newtons | <500 grams | <3000 cubic centimeters | Yes |
| Light Items | <2 Newtons | <500 grams | <3000 cubic centimeters | No |

In one embodiment, the selection module 205 displays a list of categories and/or groups of categories on the display 120. The user may select the plurality of categories from the displayed list.

In an alternate embodiment, the selection module 205 receives a user profile that includes a plurality of predetermined categories. The selection module 205 may receive the user profile in response to an identification of the user. For example, the user may swipe a bankcard in the bankcard receptacle 135 and a controller that will be described hereafter may identify the user from the bankcard. The controller may further access the user profile using the user's identity. The selection module 205 may select the predetermined categories from the user profile as the plurality of categories.

The identification module 210 identifies a purchase item. In one embodiment, the identification module 210 comprises the scanner 110. The scanner 110 may scan an identifier disposed on the purchase item. For example, the scanner 110 may scan a bar code label identifier disposed on the purchase item. Alternatively, the scanner 110 may scan a RFID tag disposed on the purchase item. The scanner 110 may further retrieve an identifier code from the identifier.

In one embodiment, the identification module identifies the purchase item from the identifier code of the identifier. The identification module 210 may use the identifier code as a key to access information about the purchase item from a database as is well known to those skilled in the art.

The association module 215 associates a selected category of the plurality of categories with the purchase item. Each purchase item may include one or more characteristics. Purchase item characteristics may include volume, weight, fragility, liquid expression, and the like. The association module 215 may match the characteristics of the purchase item with criteria of the selected category. For example, for the illustrative categories of Table 1 and a purchase item with a fragility of one Newton (1 N), a weight of four hundred grams (400 g), a volume of two thousand cubic centimeters 2000 $cm^3$, and no liquid expression, the association module 215 may associate the light items category with the purchase item.

The sorter 220 motivates the purchase item to a specified bin of a plurality of bins as will be described hereafter. The specified bin is associated with the selected category. In one embodiment, each category is associated with a bin. Each bin may be associated with one or more categories.

In one embodiment, the bagger 225 bags one or more purchase items from a bin as will be described hereafter. The apparatus 200 sorts purchase items to bins to facilitate removal and/or bagging of the purchase items including automated bagging by the bagger 225.

Figure 3A:
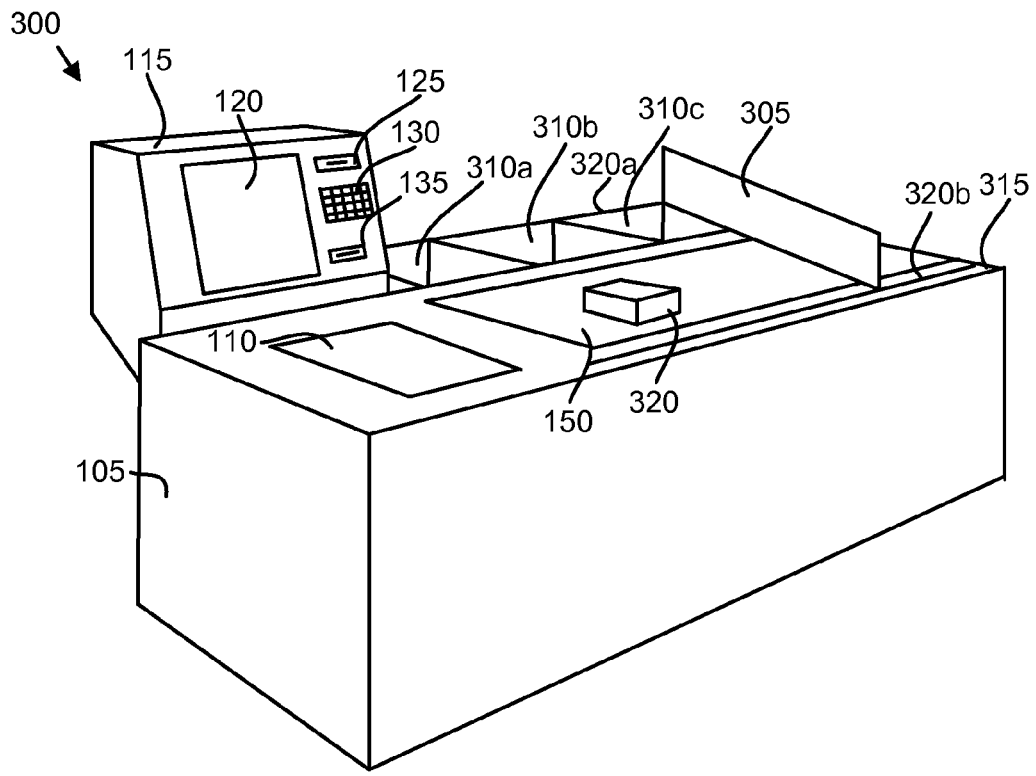
FIGS. 3A and 3B are perspective drawings illustrating one embodiment of a sorting self-checkout system of the present invention.

FIG. 3A is a perspective drawing illustrating one embodiment of a sorting self-checkout system 300 of the present invention. The system 300 embodies the elements of FIG. 2 to sort purchase items 320 for the self-checkout system 100 of FIG. 1. In addition, the system 300 refers to elements of FIGS. 1-2, like numbers referring to like elements.

The system 300 includes a platform 105, a user interface 115, a scanner 110, a conveyer 150, an item actuator 305, and one or more bins 310. The user interface 115 includes a display 120, a cash receptacle 125, a keypad 130, and a bankcard receptacle 135. In one embodiment, the sorter 220 embodies the conveyer 150 and item actuator 305. The system 300 automatically sorts a purchase item 320 after the purchase item 320 is scanned.

The user may scan the purchase item 320 using the scanner 110. In addition, the user may place the purchase item 320 on the conveyer 150. The conveyer 150 may motivate the purchase item 320 away from the scanner 110 toward a distal end 315 of the platform 105.

In one embodiment, the item actuator 305 diverts the purchase item 320 from the conveyer 150 into a bin 310. The conveyer 150 provides a force to motivate the purchase item 320 along the item actuator 305 and into a bin 310. In the depicted embodiment, the item actuator 305 is configured to divert the purchase item 320 to a third bin 310c.

Figure 3B:
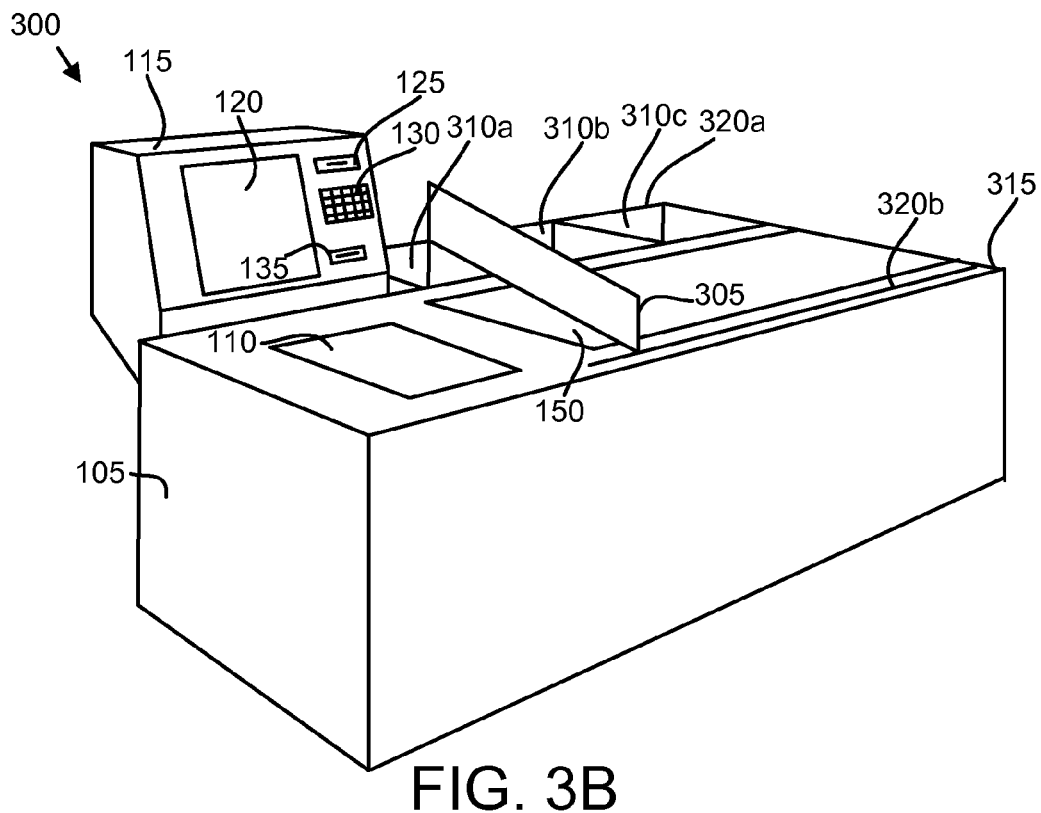

FIG. 3B is a perspective drawing illustrating the sorting self-checkout system 300 of FIG. 3A. The item actuator 305 is shown disposed to divert purchase items 320 into a first bin 310a. In one embodiment, the item actuator 305 comprises and is positioned by one or more motors disposed with the platform 105 as is well known to those skilled in the art. The motors by move connectors along tracks 320. The connectors 320 may be in physical communication with item actuator 305. Thus the motors may position the item actuator 305 in a plurality of spatial configurations. By positioning the item actuator 305, the system 300 sorts purchase items 320 into a specified bin 310 that is associated with the selected category for the purchase item 320 as the item actuator 305 diverts the purchase items 320 into the specified bin 310.

Figure 4A:
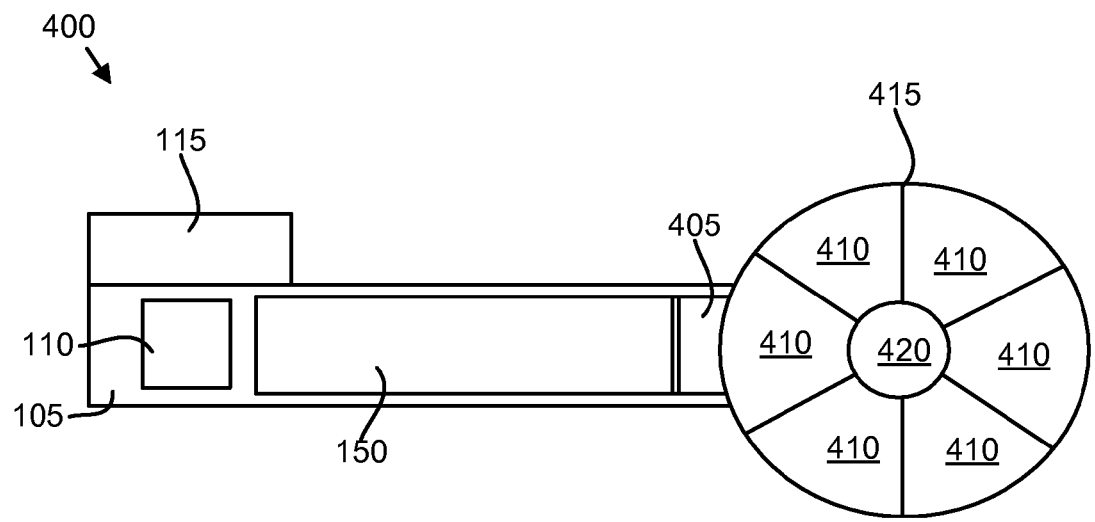
FIG. 4A is a top view drawing illustrating one embodiment of a self-checkout system with rotary bins of the present invention.

FIG. 4A is a top view drawing illustrating one embodiment of a self-checkout system 400 with rotary bins 415 of the present invention. The system 400 incorporates the elements of FIG. 2 to sort purchase items. The description of the system 400 refers to elements of FIGS. 1-3B, like numbers referring to like elements. The system 400 includes a conveyer 150, a disposition conveyer 405, and rotary bins 415. The rotary bins 415 may embody the sorter 220.

The scanner 110, user interface 115, and conveyer 150 of FIGS. 3A and 3B are shown. The conveyer 150 motivates the purchase item 320 from the vicinity of the scanner 110 towards the disposition conveyer 405. The disposition conveyer 405 receives the purchase item 320 from the conveyer 150 and motivates the purchase item 320 to the rotary bins 415.

The rotary bins 415 include a plurality of bins 410 disposed around a pivot 420. The bins 410 may be in physical communication with the pivot 420 such that the bins 410 rotate as the pivot 420 is rotated. A bin actuator that will be described hereafter rotates the bins 410 about the pivot 420 to position a specified bin 410 to receive the purchase item 320 from the disposition conveyer 405 as will be shown hereafter.

Figure 4B:
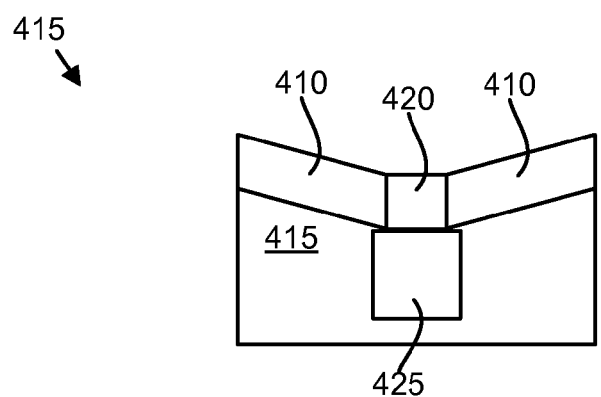
FIG. 4B is a cut-away side view drawing illustrating one embodiment of rotary bins of the present invention.

FIG. 4B is a cut-away side view drawing illustrating one embodiment of the rotary bins 415 of FIG. 4A. The description of the rotary bins 415 refers to elements of FIGS. 1-4A, like numbers referring to like elements.

In one embodiment, the bins 410 slope down toward the pivot 420. Thus a purchase item 320 received from the disposition conveyer 405 may slide away from the disposition conveyer 405 toward the pivot 420. In one embodiment, a bin actuator 425 is in physical communication with the pivot 420. The bin actuator 425 may be a stepper motor that is controlled by a controller that will be described hereafter. In one embodiment, the bin actuator 425 rotates the pivot 420, rotating the bins 410 about the pivot 420.

Figure 5:
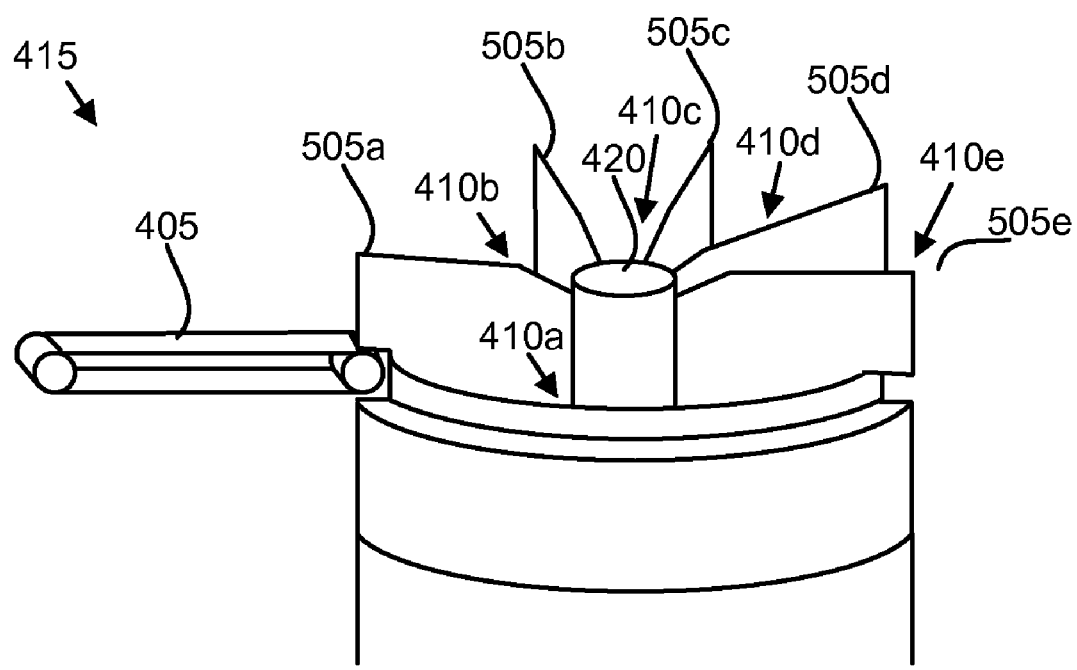
FIG. 5 is a perspective drawing illustrating one alternate embodiment of rotary bins of the present invention.

FIG. 5 is a perspective drawing illustrating one alternate embodiment of the rotary bins 415 of FIG. 4A. The description of the rotary bins 415 refers to elements of FIGS. 1-4B, like numbers referring to like elements. Fins 505 separate the bins 410. In the depicted embodiment, the fins 505 are configured to extend radially away from the pivot 420 and beyond the bins 410. In a certain embodiment, the fins 505 may motivate purchase items 320 that are stuck on the disposition conveyer 405 to fall into a bin 410 as the bins 410 rotate about the pivot 420.

Figure 6:
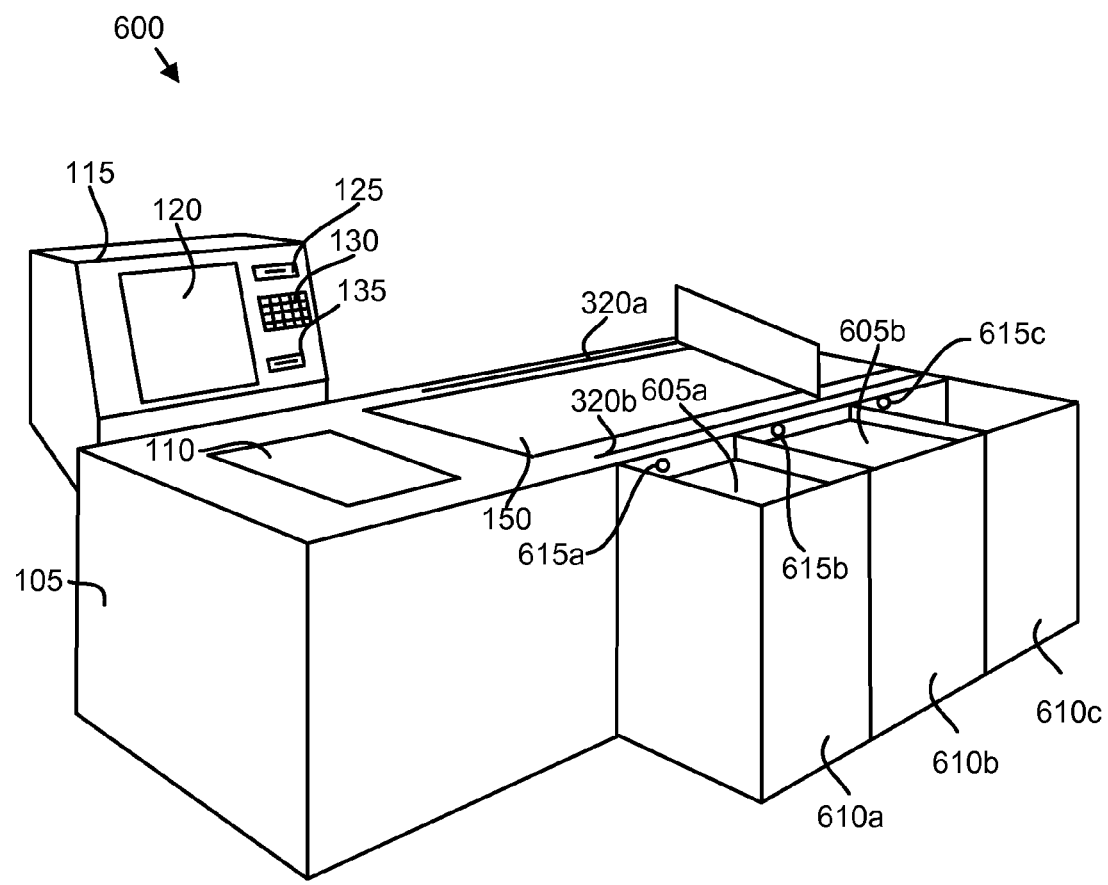
FIG. 6 is a perspective drawing illustrating one embodiment of a sorting self-checkout system with adjustable bottom bins of the present invention.

FIG. 6 is a perspective drawing illustrating one embodiment of sorting self-checkout system 600 with adjustable bottom bins of the present invention. The description of the system 600 refers to elements of FIGS. 1-5, like numbers referring to like elements. The sorting self-checkout system 300 of FIGS. 3A and 3B is shown with bins 610 disposed along the platform 105 opposite the user interface 115. The item actuator 305 of FIGS. 3A and 3B may divert purchase items 320 from the conveyer 150 into the bins as previously described.

The bins 610 may include adjustable bottoms 605. The adjustable bottoms 605 for first and second bins 610a, 610b are shown. The adjustable bottoms 605 may be spring loaded as is well known to those of skill in the art so that as purchase items are diverted into the bins 610, the adjustable bottoms 605 sink against the force of a spring from the weight of the purchase items 320. In an alternate embodiment, an actuator may adjust the position of the adjustable bottom 605. For example, the actuator may be a motor that rotates a threaded shaft. The threaded shaft may be in physical communication with the adjustable bottom 605 such that when the motor rotates the threaded shaft, the adjustable bottom 605 is motivated along the threaded shaft.

In one embodiment, a sensor 615 may determine if purchase items 320 extend above the top of a bin 610 and direct the actuator to lower the adjustable bottom 605 of the bin 610 when purchase items 320 are detected extending above the top of the bin 610. The sensor 615 may be an electric eye, a proximity sensor, or the like. In a certain embodiment, the adjustable bottoms 605 may adjust to near the top of the bin 610 when the bin 610 is emptied and/or when a new user initiates a transaction.

Figure 7A:
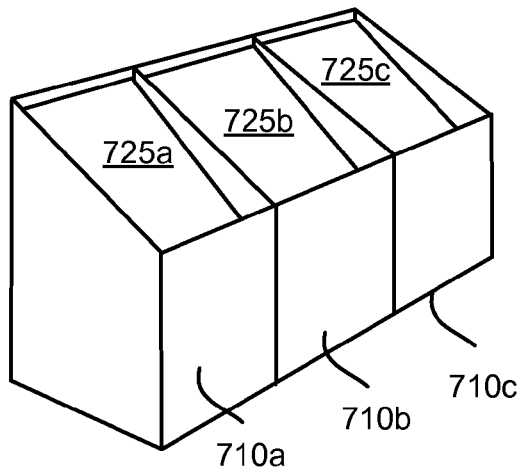
FIG. 7A is a perspective drawings illustrating one embodiment of sloped bins of the present invention.

FIG. 7A is a perspective drawing illustrating one embodiment of sloped bins 710 of the present invention. The description of the sloped bins 710 refers to elements of FIGS. 1-6, like numbers referring to like elements. The bins 710 may be disposed near a self-checkout system such as the sorting self-checkout systems 300, 600 of FIGS. 3A, 3B, and 6 and positioned similarly to the bins 310, 610 to receive diverted purchase items 320.

The bins 710 include a slope 725. The slope 725 receives a diverted purchase item 320 such that the purchase item 320 may slide down the slope 725 and away from the sorting self-checkout system 300, 600.

Figure 7B:
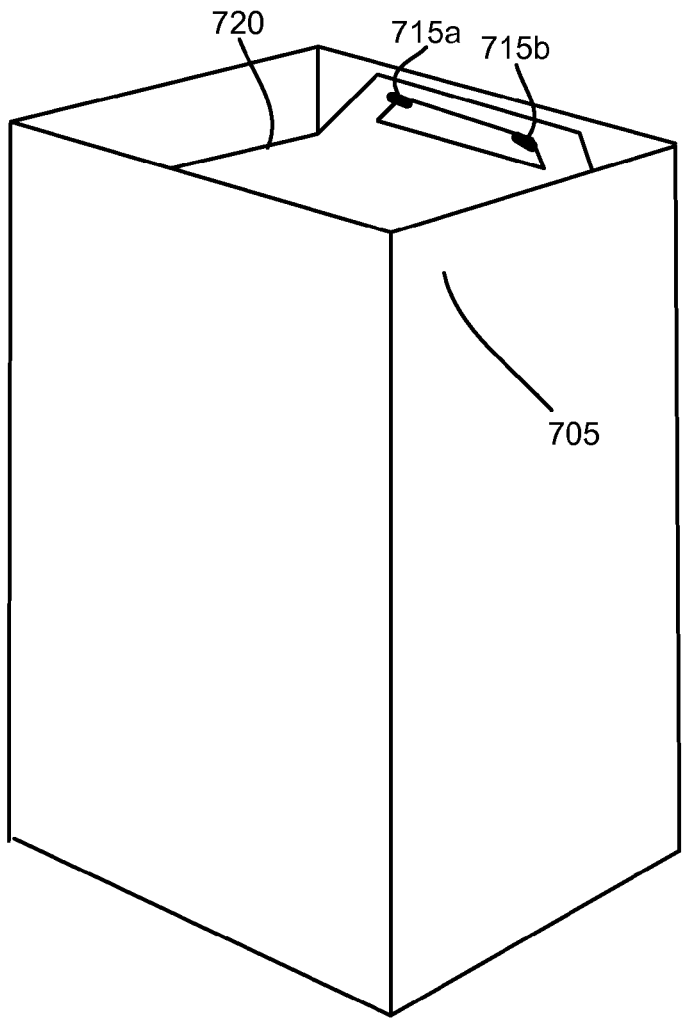
FIG. 7B is a perspective drawings illustrating one embodiment of bag holding bins of the present invention.

FIG. 7B is a perspective drawing illustrating one embodiment of a bag holding bin 705 of the present invention. The description of the bag holding bin 705 refers to elements of FIGS. 1-6, like numbers referring to like elements. The bin 705 may be disposed near a self-checkout system such as the sorting self-checkout systems 300, 600 of FIGS. 3A, 3B, and 6 and positioned similarly to the bins 310, 610 to receive diverted purchase items 320.

The bag holding bin 705 may include hooks 715. The hooks 715 may retain a shopping bag 720 such as a plastic shopping bag, a paper shopping bag, or the like with the bag 720 open to receive diverted purchase items 320.

Figure 8A:
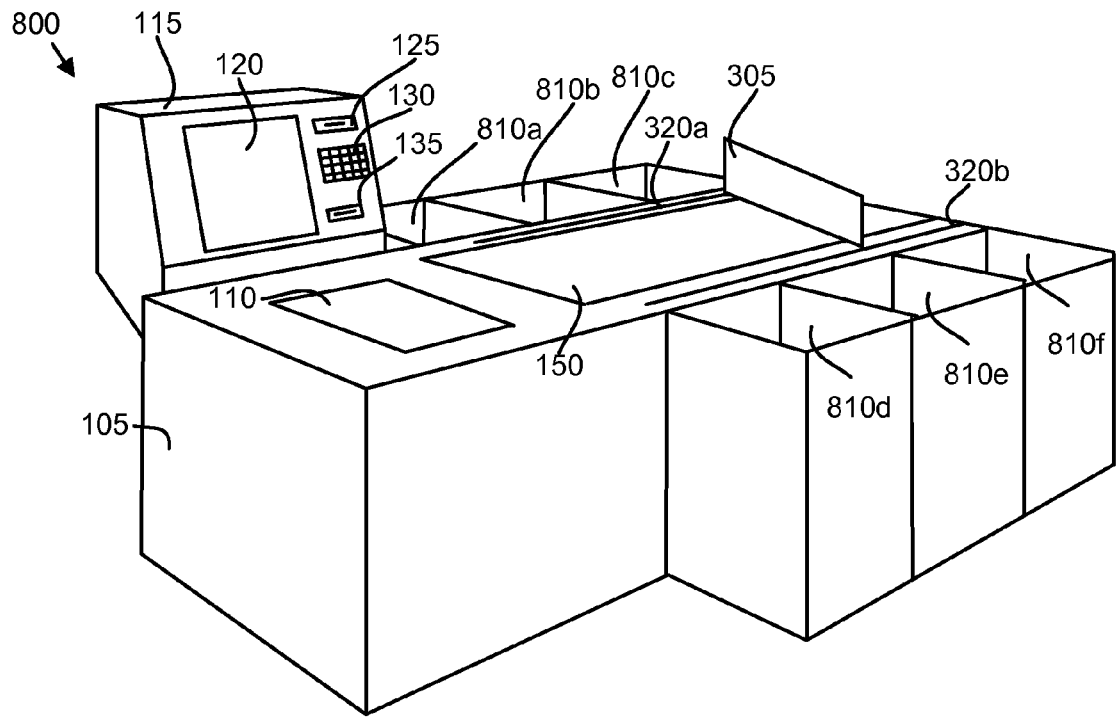
FIGS. 8A and 8B are perspective drawings illustrating one embodiment of a dual-bin-set sorting self-checkout system of the present invention.
Figure 8B:
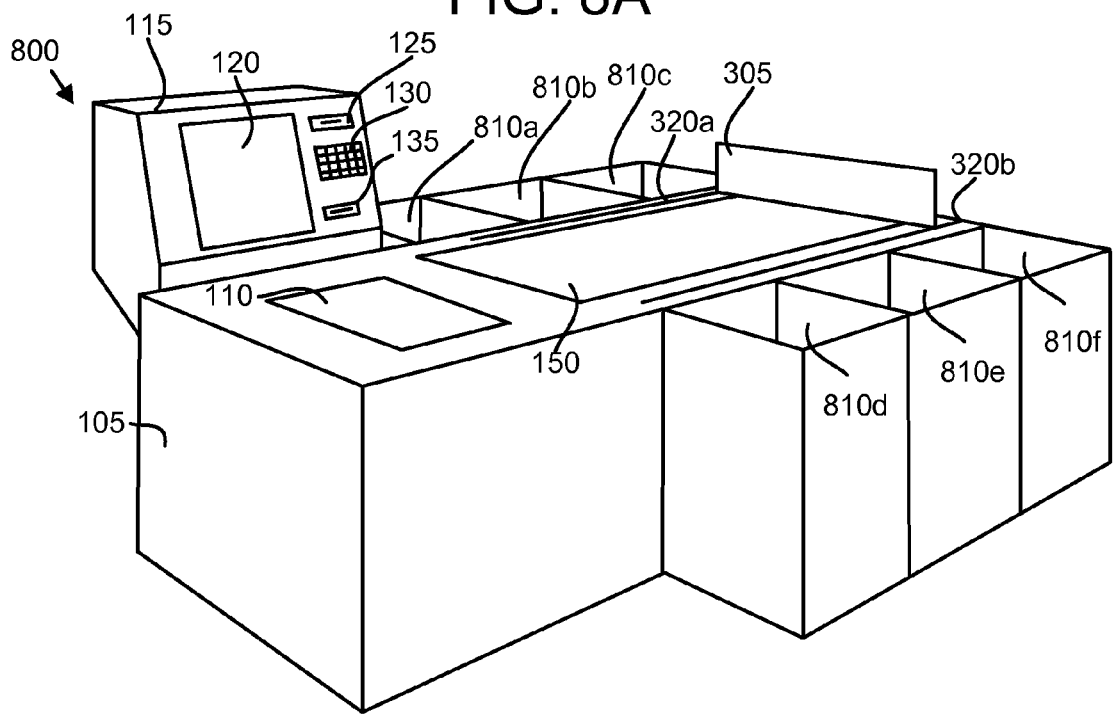

FIGS. 8A and 8B are perspective drawings illustrating one embodiment of a dual-bin-set sorting self-checkout system 800 of the present invention. The system 300 of FIGS. 3A and 3B is shown with dual sets of bins 810. The description of the system 800 refers to elements of FIGS. 1-7B, like numbers referring to like elements. One or more bins 810 are shown disposed on either side of the conveyer 150. The item actuator 305 is disposed to divert purchase items 320 into bins 810 on either side of the conveyer 150. FIG. 8A shows the item actuator 305 disposed to divert purchase items 320 into a third bin 810c while FIG. 8B shows the item actuator 305 disposed to divert purchase items 320 into a sixth bin 810f.

Figure 9A:
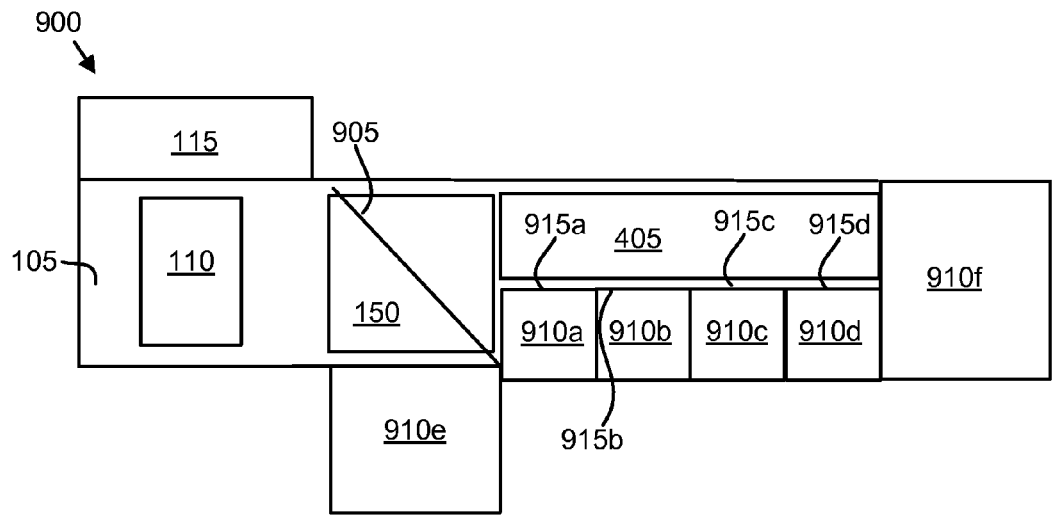
FIGS. 9A and 9B are top view drawings illustrating one alternate embodiment of actuators for a sorting self-checkout system of the present invention.
Figure 9B:
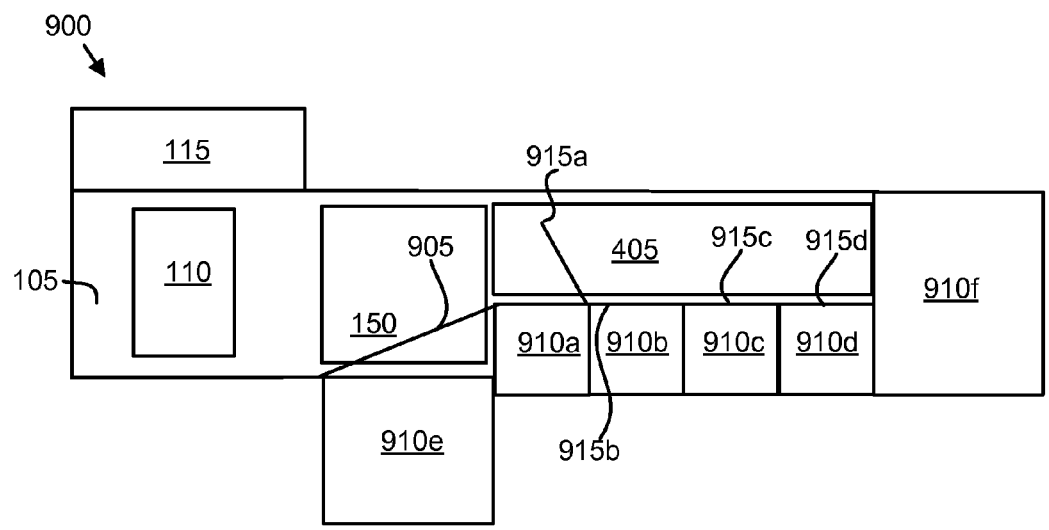

FIGS. 9A and 9B are top view drawings illustrating one alternate embodiment of item actuators 905, 915 for a sorting self-checkout system 900 of the present invention. The description of the system 900 refers to elements of FIGS. 1-8B, like numbers referring to like elements. The item actuators 905, 915 are configured to divert purchase items to bins 910 of various sizes and/or to an alternate motivating device such as the disposition conveyer 405 as shown.

The system 900 includes the platform 105, user interface 115, scanner 110, conveyer 150 of FIGS. 3A, 3B, 4A, 6, 8A, and 8B, as well as the disposition conveyer 405 of FIG. 4A. The user may scan a purchase item 320 and place the purchase item 320 on the conveyer 150 as described previously.

A plurality of bins 910 are disposed adjacent the conveyer 150 and/or the disposition conveyer 405. As shown, the size of the bins 910 may vary from bin 910 to bin 910. In the depicted embodiment, first, second, third, and forth bins 910a, 910b, 910c, 910d are configured to receive smaller purchase items 320 while fifth and sixth bins 910e, 910f are configured to receive bulk purchase items 320.

A primary item actuator 905 may be positioned to either divert purchase items 320 from the conveyer 150 to the fifth bin 910e or to divert the purchase items 320 from the conveyer 150 to the disposition conveyer 405. The primary item actuator 905 may be motivated by motors to position the primary item actuator 905 to divert the purchase items. FIG. 9A shows the primary item actuator 905 positioned to divert purchase items 320 into the fifth bin 910e. FIG. 9B shows the primary item actuator 905 positioned to divert purchase items 320 to the disposition conveyer 405.

The first, second, third, and forth bins 910a, 910b, 910c, 910d each include a door item actuator 915. Each door item actuator 915 may move to an open position as illustrated by a first door item actuator 915a in FIG. 8B. The door item actuator 915 in the open position may divert a purchase item 320 from the disposition conveyer 405 into the corresponding bin 910. The door item actuators 915 may also be positioned in a closed position wherein the door item actuators 915 block purchase items from being diverted into the bins 910 corresponding to the door item actuators 915. For example, the second, third, and fourth door item actuators 915b, 915c, 915d of FIG. 9B and the door item actuators 915 of FIG. 9A are shown in closed positions.

In one embodiment, the primary item actuator 905 may divert a purchase item 320 to the disposition conveyer 405 and no door item actuator 915 may divert the purchase item 320 into a bin 910. As a result, the disposition conveyer 405 may motivate the purchase item into the sixth bin 910f.

In one example, the association module 215 may associate a first purchase item 320 with a first category. In addition, the first category may be associated with the fifth bin 910e. The sorter 220 may comprise the primary item actuator 905 and the door item actuators 915 and position the primary item actuator 905 to divert the first purchase item 320 into the fifth bin 910e as shown in FIG. 9A. Similarly, the association module 215 may associate a second purchase item 320 with a second category. The second category may be associated with the first bin 910a. The sorter 220 may position the primary item actuator 905 to divert the second purchase item 320 to the disposition conveyer 405 and the first door item actuator 915a to divert the second purchase item 320 into the first bin 910a as shown in FIG. 9B.

Figure 10:
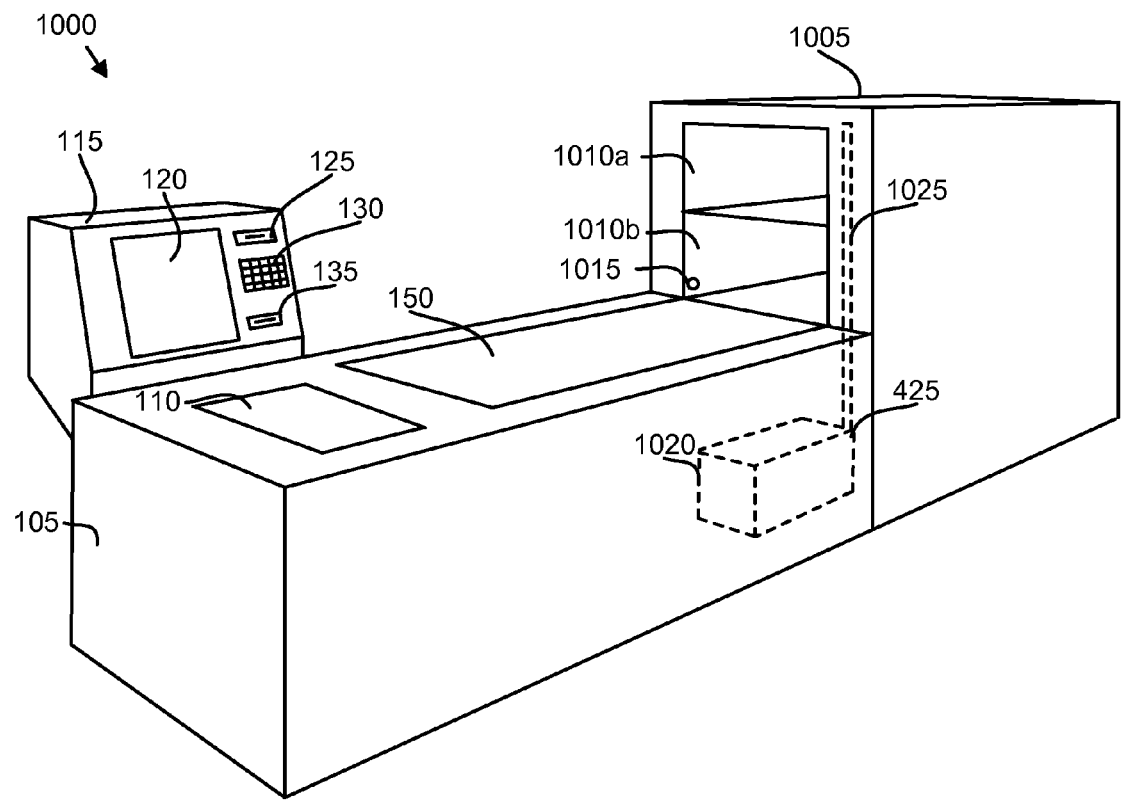
FIG. 10 is a perspective drawing illustrating one embodiment of a sorting self-checkout system with vertical bins of the present invention.

FIG. 10 is a perspective drawing illustrating one embodiment of a sorting self-checkout system 1000 with vertical bins 1005 of the present invention. The description of the system 1000 refers to elements of FIGS. 1-9B, like numbers referring to like elements. IN addition, the system 300 of FIGS. 3A and 3B is shown with bins 1010 arrayed vertically and perpendicular to the conveyer 150. The system 1000 includes the platform 105, user interface 115, scanner 110, conveyer 150 described previously. The system 1000 also includes vertical bins 1005, and a bin actuator 425. The bin actuator 425 includes a motor 1020, and a threaded shaft 1025.

The conveyer 150 motivates purchase items 320 to the vertical bins 1005. The vertical bins 1005 comprise a plurality of vertical bins 1010 disposed linearly and vertically to receive purchase items 320. First and second vertical bins 1010a, 1010b are shown, although any number of vertical bins 1010 may be employed.

The bin actuator 425 may position the vertical bins 1010 by moving the bins 1010 up and/or down. In one example, if the second vertical bin 1010b is specified to receive a purchase item 320, the motor 1020 may drive the threaded shaft 1025. The threaded shaft 1025 may be physically connected to the vertical bins 1010 such that the rotation of the threaded shaft 1025 moves the vertical bins 1010. The bin actuator 425 may position the second vertical bin 1010*b* such that the second vertical bin 1010*b* is co-planar with the conveyer 150. The conveyer 140 may then motivate the purchase item 320 into the second vertical bin 1010*b*. In one embodiment, a sensor 1015 detects the purchase item 320 entering a bin 1010. The sensor 1015 may be an electric eye, a proximity sensor, or the like.

Figure 11:
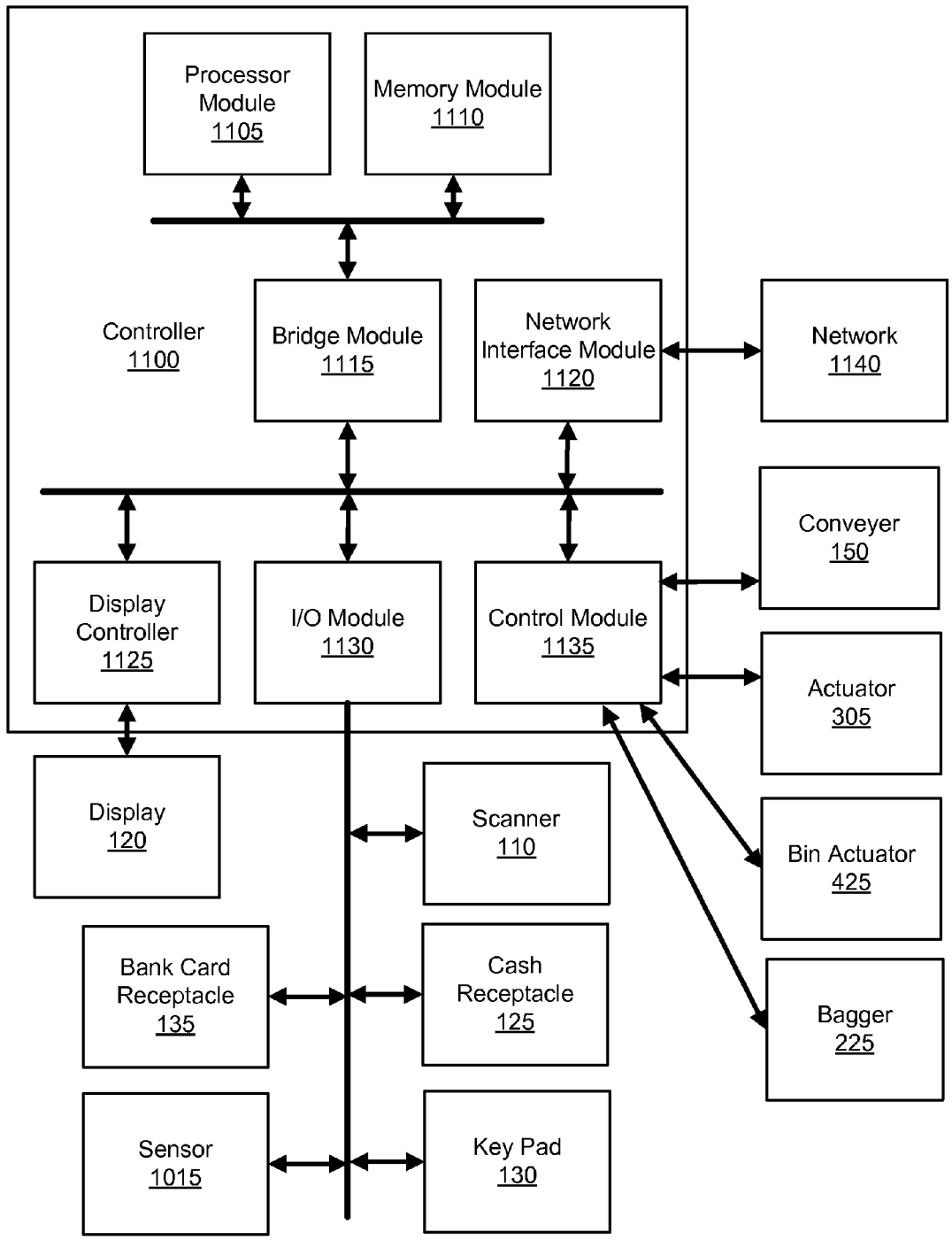
FIG. 11 is a schematic block diagram illustrating one embodiment of a controller of the present invention.

FIG. 11 is a schematic block diagram illustrating one embodiment of a controller 1100 of the present invention. The controller 1100 includes a processor module 1105, a memory module 1110, a bridge module 1115, a network interface module 1120, a display controller 1125, an input/output (I/O) module 1130, and a control module 1135. The description of the controller 1100 refers to elements of FIGS. 1-10, like numbers referring to like elements. The controller 1100 may control the interaction of the elements described in FIGS. 1-10.

The processor module 1105, memory module 1110, bridge module 1115, network interface module 1120, display controller 1125, I/O module 1130, and control module 1135 may be fabricated of semiconductor gates on one or more semiconductor substrates. Each semiconductor substrate may be packaged in one or more semiconductor devices mounted on circuit cards. Connections between the processor module 1105, memory module 1110, bridge module 1115, network interface module 1120, display controller 1125, I/O module 1130, and control module 1135 may be through semiconductor metal layers, substrate to substrate wiring, circuit card traces, and/or wires connecting the semiconductor devices.

The memory module 1110 stores software instructions and data. The processor module 1105 executes the software instructions and manipulates the data as is well know to those skilled in the art. In one embodiment, the memory module 1110 stores and the processor module 1105 executes one or more software processes comprising in whole or in part the selection module 205, identification module 210, and the association module 215.

The processor module 1105 communicates with the network interface module 1120, display controller 1125, I/O module 1130, and control module 1135 through the bridge module 1115. The controller 1100 is shown in communication with the display 120 through the display controller 1125. The controller 1100 is also shown communicating with the scanner 110, the cash receptacle 125, keypad 130, the bankcard receptacle 135, and the sensor 130 through the I/O module 1130. In addition, the controller 1100 is depicted communicating with a network 1140 through the network interface module 1120. Communications may be digital signals, analog signals, optical signals, or the like.

In one embodiment, the controller 1100 controls the conveyer 150, the item actuator 305, bin actuator 425, and the bagger 225 through the control module 1135. The control module 1135 may receive commands from the processor module 1105 to control the operation of the conveyer 150, item actuator 305, bin actuator 425, and bagging module 225 using digital position commands, electric currents, analog signals, and the like.

Figure 12:
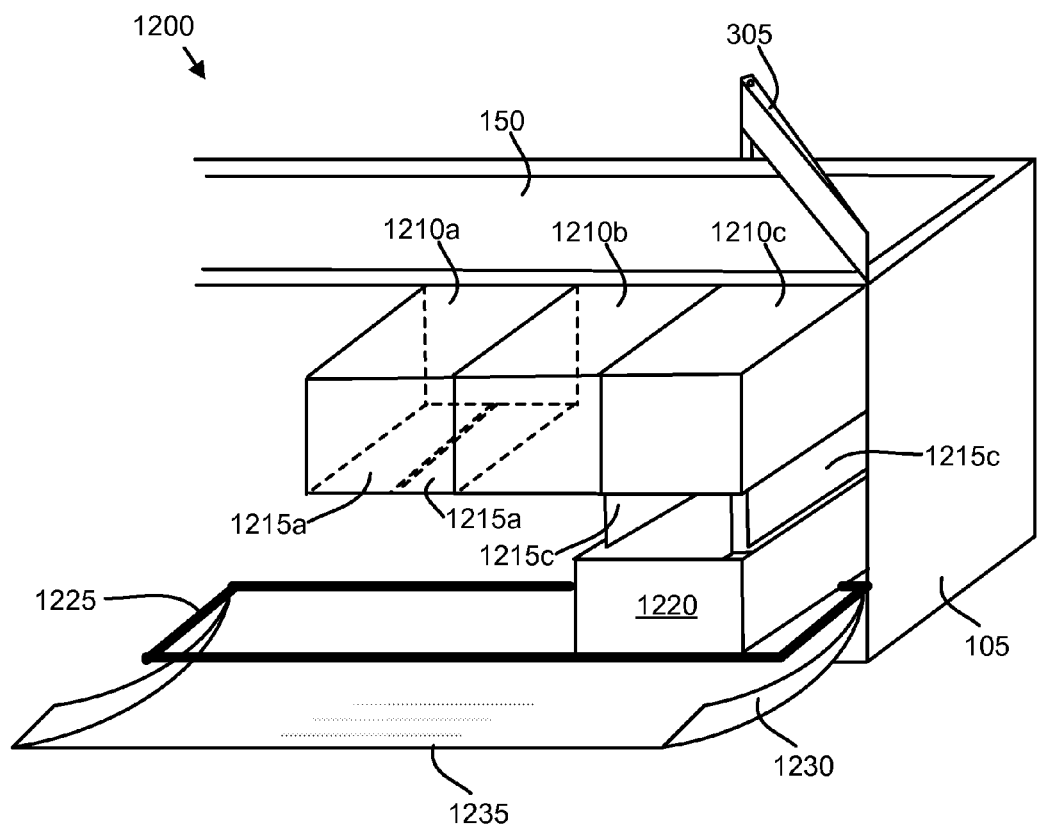
FIG. 12 is a perspective drawing illustrating one embodiment of bagging system of the present invention.

FIG. 12 is a perspective drawing illustrating one embodiment of bagging system 1200 of the present invention. The description of the system 1200 may refer to elements of FIGS. 1-11, like numbers referring to like elements. The bagger 1200 is shown integrated with a self-checkout system platform 105. However, the bagger 1200 may also be configured as a discrete device or as an integral part of the rotary bins 415.

The bagging system 1200 includes a bagger 1220, one or more bins 1210, support rails 1225, and chute 1230. The support rails 1225 may be physically connected to the platform 105 and may support the bagger 1220. In one embodiment, the bagger 1220 is configured to move along the support rails 1225 parallel to the platform 105. In a certain embodiment, a motor move the bagger 1220 along the support rails 1225. The motor may disposed within the bagger 1220 and rotate wheels and/or gears that ride upon the support rails 1225. Alternatively, the motor may be disposed with the platform 105 and may move the bagger 1220 by motivating a cable running through one rail of the support rails 1225.

The bins 1210 may be the bins 310, 410, 610, 710, 810, 910, 1010, of FIGS. 3, 4, and 6-10. The bins 1210 are configured with doors 1215. The doors 1215 are configured with an open position and a closed position. A first set of doors 1215*a* for a first bin 1210*a* are shown in the closed position while a third set of doors 1215*c* for a third bin 1210*c* are shown in the open position. The doors 1215 retain purchase items 320 within the bin 1210 when in the closed position. An actuator such as a solenoid may hold the doors 1215 in the closed position.

The actuator may further allow the doors 1215 to rotate about hinges to the open position. In the open position, the doors 1215 may allow the purchase items 320 to drop from the bin 1210 into the bagger 1220. The bagger 1220 may bag the purchase items 320 as will be described hereafter.

In one example, the system 1200 may move the bagger 1220 along the support rails 1225 to a position beneath a bin 1210. The bin 1210 may contain one or more purchase items 320, the purchase items 320 retained within the bin 1210 by the doors 1215 in the closed position. The system 1200 may open the doors 1215 of the bin 1210 to open position, allowing the purchase items 320 to fall into the bagger 1220. The bagger 1220 may bag the purchase items 320 and motivate the bagged purchase items 320 onto the chute 1230. The bagged purchase items 320 may slide down the chute 1230 to a retrieval position 1235.

Figure 13:
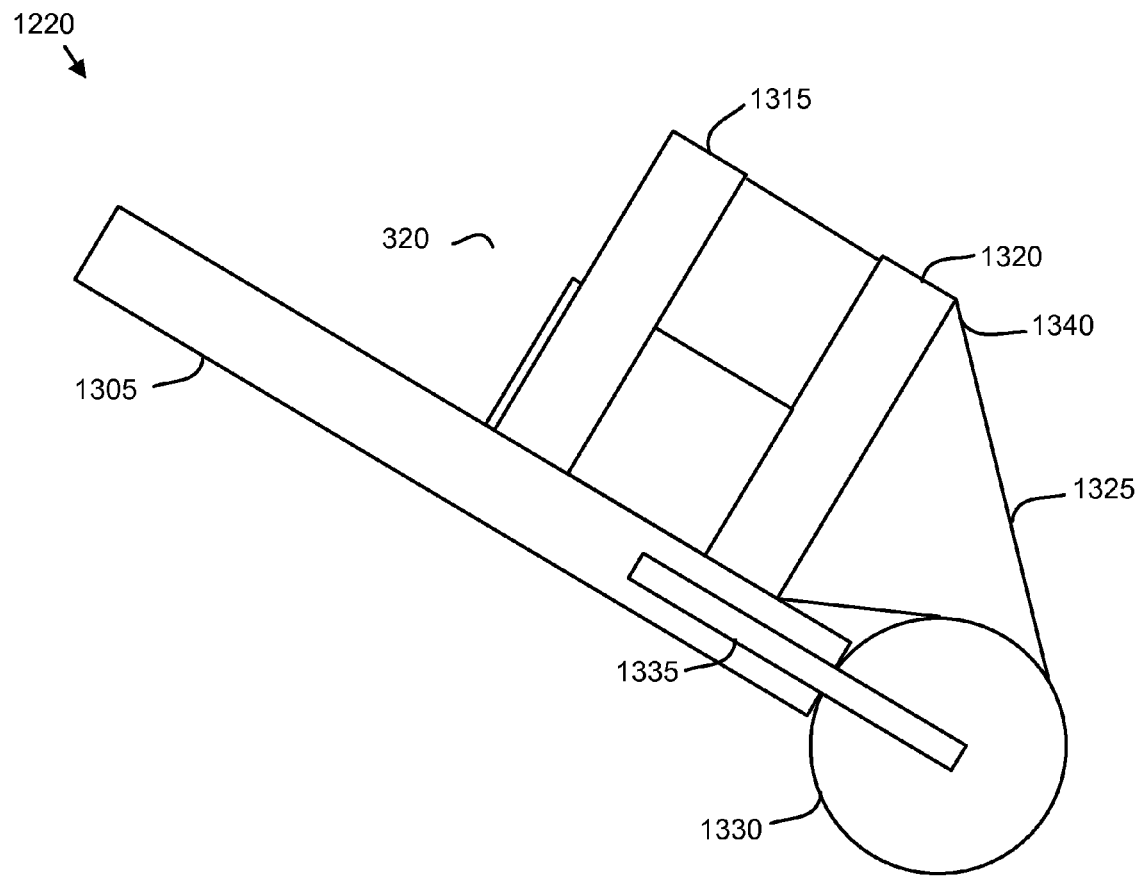
FIG. 13 is a side view drawing illustrating one embodiment of a bagger of the present invention.

FIG. 13 is a side view drawing illustrating one embodiment of bagger 1220 of the present invention. The bagger 1220 may be the bagger 1220 of FIG. 12. The description of the bagger 1220 refers to elements of FIGS. 1-12, like numbers referring to like elements. The bagger 1220 includes a base 1305, an encompassing frame 1315, a sealer 1320, a tubular bagging material 1325, a tube roll 1330, and a roll support 1335. The tubular bagging material 1325 is referred to herein as a tube 1325.

A purchase item 320 is shown disposed on the base 1305. In one embodiment, the purchase item 320 is allowed to fall to the base 1305 from a bin 1210 as described in FIG. 12. The encompassing frame 1315 encompasses the purchase item 320 within the tube 1325. In one embodiment, the encompassing frame 1315 moves along the base 1315 such that purchase item 320 passes within the encompassing frame 1315. The encompassing frame may further pull the tube 1325 to encompass the purchase item 320 with the tube 1325. In one embodiment, the tube 1325 is configured as a plastic material. The sealer 1320 may thermally seal the tube 1325 in proximity to the purchase item 320 between the purchase item 320 and a distal end 1340 of the tube 1325. In addition, the sealer 1320 may sever a portion of the tube 1325 enclosing the purchase item 320 within the tube 1325 in proximity to the thermal seal between the thermal seal and the distal end 1340 of the tube 1325.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 14:
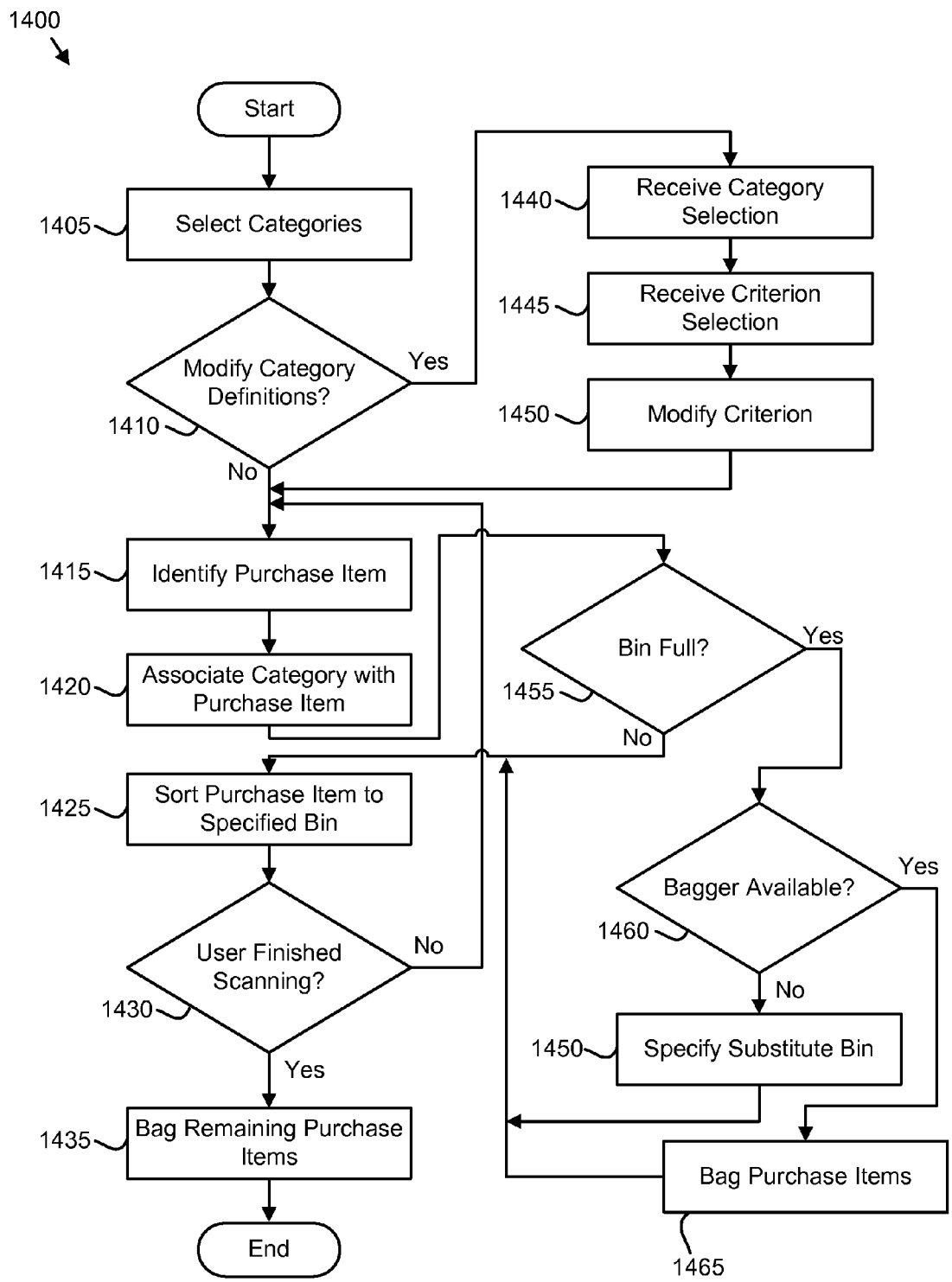
FIG. 14 is a schematic flow chart diagram illustrating one embodiment of a purchase item sort method of the present invention.

FIG. 14 is a schematic flow chart diagram illustrating one embodiment of a purchase item sort method 1400 of the present invention. The method 1400 substantially includes the steps to carry out the functions presented above with respect to the operation of the described apparatus 200, 415, 705, 725, 1100, 1220 and system 300, 400, 600, 800, 900, 1000, 1200 of FIGS. 2-13. The description of the method 1400 refers to elements of FIGS. 1-13, like numbers referring to like elements. For simplicity, bins 310, 410, 610, 705, 725, 810, 910, 10101, 1210 of all configurations are referred to hereafter as bins 310.

The method 1400 begins and the selection module 205 selects 1405 a plurality of categories. In one embodiment, the selection module 205 executing on the processor module 1105 may select categories stored in the memory module 1110. In an alternate embodiment, the selection module 205 may receive a user category set selection from the user through the keypad 130 and/or display 120. For example, the display 120 may display one or more category sets. Each category set may list a plurality of categories. The user may select a category set by depressing a key on the keypad 130 and/or my touching the category set on the display 120. The category set is communicated to the selection module 205 as the selected categories.

In one embodiment, the selection module 205 determines 1410 whether to modify the category definitions. The selection module 205 may ask the user if the user wishes to modify the category definitions and determine 1410 to modify the category definitions if the user responds that the user wishes to modify the definitions. The selection module 205 may ask the user with a prompt displayed on the display 120. In addition, the selection module 205 may receive user reply from the keypad 130 and/or the display 120.

If the selection module 205 determines 1410 to modify the category definitions, the selection module 205 may receive 1440 a category selection. In one embodiment, the selection module 205 prompts the user for the category selection. In addition, the selection module 205 may receive 1445 a criterion selection from the user. In a certain embodiment, the selection module 205 prompts the user for a criterion associated with the category selection. The selection module 205 may further modify 1450 the selected criterion. In one embodiment, the selection module 205 prompts the user for a modification for the criterion selection, receives the modification from the user, and modifies 1450 the selected criterion with the modification.

If the selection module 205 determines not to modify the category definitions and/or subsequent to the selection module 205 modifying 1450 the criterion, the identification module 210 identifies 1415 a purchase item 320. In one embodiment, user may scan the purchase item 320 with the scanner 110 and the scanner 110 may communicate an identifier code through the I/O module 1130 to the identification module 210 executing on the processor module 1105. The identification module 210 may access a database over the network 1140 to retrieve purchase item information using the identifier code. The purchase item information may include a product name of the purchase item 320 and one or more purchase item characteristics.

The association module 215 associates 1420 a selected category with the purchase item 320. In one embodiment, the association module 215 matches the purchase item characteristics with criteria of the selected category as described for FIG. 2. In an alternate embodiment, the purchase item information specifies a category for the purchase item 320.

In one embodiment, the sorter 220 determines 1455 if a specified bin 310 associated with the selected category is full. The sorter 220 may determine 1455 that the specified bin 310 is full is a full if a full bin flag is set as will be described hereafter. If the sorter 220 determines 1455 that the specified bin 310 is full, the sorter 220 may determine 1460 if the bagger 1220 is available. If the sorter 220 determines 1460 the bagger 1220 is available, the bagger 1220 bags 1465 the purchase items 320 from the specified bin 310. If the sorter 220 determines 1460 the bagger 1220 is not available, the sorter 220 may specify 1450 a substitute bin 310 as the specified bin 310. In one embodiment, the substitute bin 310 is a bin 310 that is not assigned to a category.

If the sorter 220 determines 1455 that the specified bin 310 is not full, if the sorter 220 specifies 1450 the substitute bin 310, and/or if the bagger 225 bags 1465 the purchase items from the specified bin 310, the sorter 220 sorts 1425 the purchase item 320 to the specified bin 310 as will be described hereafter. In one embodiment, the controller 1100 determines 1430 if the user is finished scanning purchase items. The controller 1100 may determine 1430 the user is finished from a user response, from receiving a payment, or the like. If the controller 1100 determines 1430 the user not finished scanning, the identification module 210 identifies 1415 a next purchase item 320.

If the controller 1100 determines 1430 the user is finished scanning purchase items 320, the bagger 1220 may bag 1435 the purchase items 320 in all bins 310 containing purchase items 320 and the method 1400 terminates. The method 1400 sorts purchase items 320 to specified bins 310 to speed the bagging and/or removal of the purchase items 320 from a self-checkout system.

Figure 15:
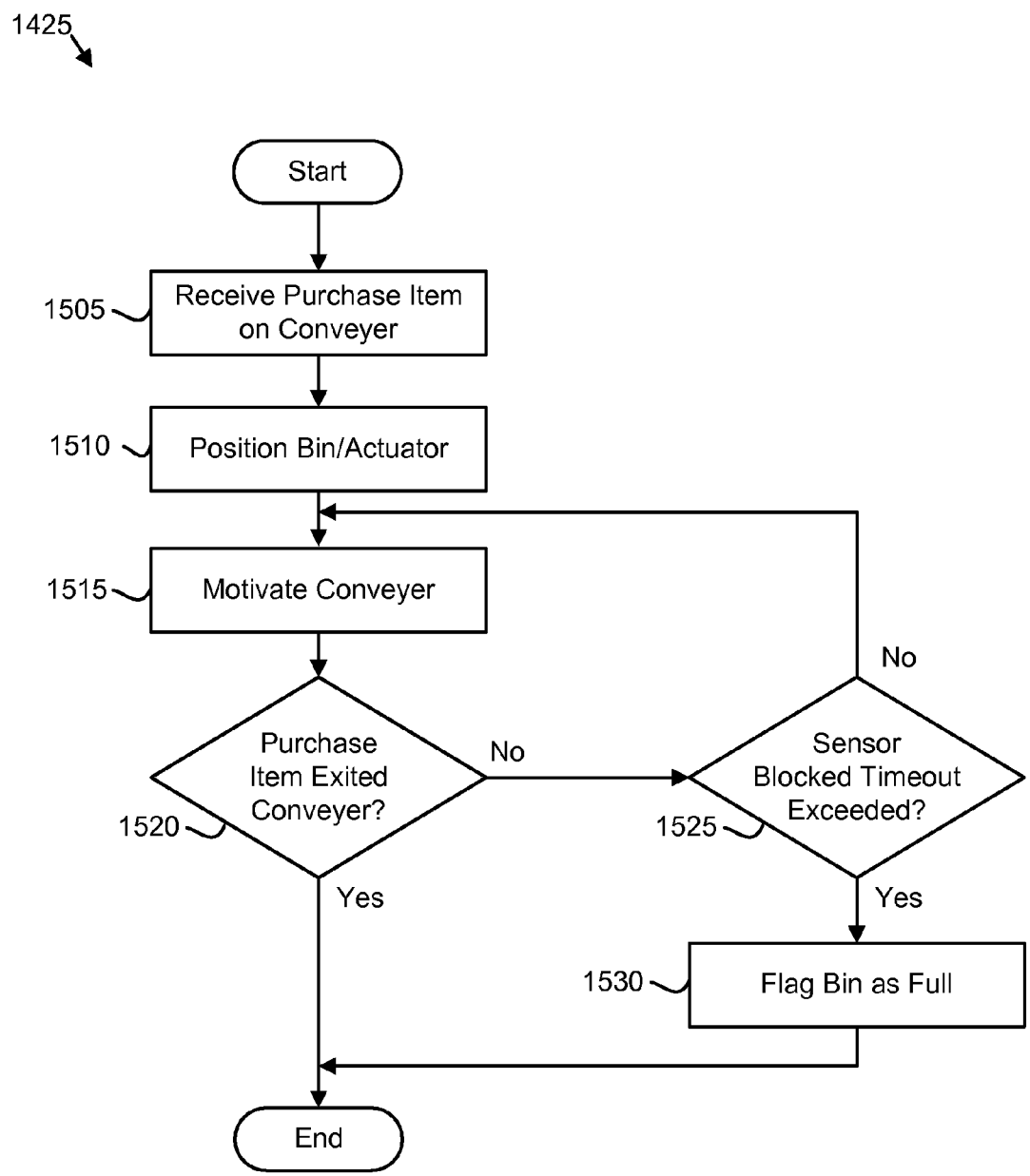
FIG. 15 is a schematic flow chart diagram illustrating one embodiment of a sorting method of the present invention.

FIG. 15 is a schematic flow chart diagram illustrating one embodiment of a sorting method 1425 of the present invention. The method 1425 illustrates step 1425 of FIG. 14, in addition, the description of the method 1425 refers to elements of FIGS. 1-14, like numbers referring to like elements.

The method 1425 begins, and in one embodiment the conveyer 150 receives 1505 the purchase item 320. The sorter 220 may include one or more software programs that executing on the processor module 1105 that control the conveyer 150, the item actuator 305, and/or the bin actuator 425. The sorter 220 may position 1510 the specified bin 310 to receive the purchase item 320 using the bin actuator 405. In one embodiment, the sorter 220 also positions the item actuator 305 to divert the purchase item 320. For example, the processor module 1105 may command the bin actuator 425 to position 1510 a rotary bin 410 of the rotary bins 415 to receive the purchase item 320. In an alternate example, the processor module 1105 positions 1510 the item actuator 305 to divert the purchase item 320 into the specified bin 310.

The sorter 220 further motivates 1515 the conveyer 150 to move the purchase item 320 to the specified bin 310. In one embodiment, the sensor 1015 determines 1520 if the purchase item 320 exits the conveyer 150. If the sensor 1015 determines 1520 the purchase item 320 exits the conveyer 150, the method 1425 terminates. If the sensor 1015 determines 1520 the purchase item 320 has not exited the conveyer, the sorter 220 determines 1525 if a sensor blocked timeout is exceeded. The sensor block timeout may be a time interval that the sorter 220 waits before determining that the specified bin 310 is full.

If the sorter 220 determines 1525 that the sensor blocked timeout is not exceeded, the sorter 220 continues to motivate 1515 the conveyer 150. If the sorter 220 determines 1530 that the sensor blocked timeout is exceeded, the sorter 220 flags the specified bin 310 as full by setting a full bin flag and the method 1425 terminates. In one embodiment, the sorter 220 flags the specified bin 310 as full by writing a data value to a full bin flag data field associated with the specified bin 310 that is stored in the memory module 1110.

The embodiment of the present invention identifies 1415 a purchase item 320, associates 1420 the purchase item 320 with a category, and sorts 1425 the purchase item 320 to a bin 310 associated with the category, wherein the bin 310 is one of a plurality of bins 310. The embodiment of the present invention may also bag 1465 one or more purchase items 320 from each bin 310.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to sort purchase items, the apparatus comprising:
    a selection module that selects a plurality of categories in response to identifying a predefined user profile associated with a user, the user having a plurality of purchase items at a checkout station, the user profile comprising a plurality of predetermined categories, each predetermined category associated with one or more criterion for bagging purchase items, wherein identifying a predefined user profile associated with the user comprises receiving an identification from the user;
    an identification module that identifies a purchase item based at least in part upon an identifier disposed on the purchase item;
    an association module that associates a selected category of the plurality of categories of the user profile with the purchase item using a criterion for bagging purchase items; and
    an automatic sorter that motivates the purchase item to a specified bin of a plurality of bins at a checkout station wherein the specified bin is associated with the selected category.

2. The apparatus of claim 1, wherein the sorter comprises a conveyer to motivate the purchase item to the selected bin.

3. The apparatus of claim 2, wherein the plurality of bins are disposed radially about a pivot and wherein the sorter comprises a bin actuator configured to rotate the bins about the pivot to position the specified bin to receive the purchase item from the conveyer.

4. The apparatus of claim 2, wherein the plurality of bins are disposed linearly and wherein the sorter comprises a bin actuator configured to position the specified bin to receive the purchase item from the conveyer.

5. The apparatus of claim 2, wherein the sorter comprises an item actuator configured to divert the purchase item from the conveyer to the specified bin.

6. The apparatus of claim 1, wherein the criterion is selected from weight, size, product class, and fragility.

7. The apparatus of claim 1, wherein the identifier comprises a radio frequency identification (RFID) tag and the identification module comprises an RFID module configured to retrieve an identifier code from the RFID tag.

8. The apparatus of claim 1, wherein the identifier comprises a bar code label and the identification module comprises a bar code scanner configured to retrieve an identifier code from the bar code label.

9. The apparatus of claim 1, wherein the selection module further modifies one or more criterion associated with a category of the user profile in response to input from the user.

10. The apparatus of claim 1, wherein receiving an identification from the user comprises retrieving data from an electronic device, the data uniquely identifying the predefined user profile associated with the user.

11. The apparatus of claim 1, wherein receiving an identification from the user comprises one or more of reading a credit card of the user, reading a store membership card of the user, reading an identification card of the user, and receiving a personal identification number input by the user.

12. A method for deploying computer infrastructure, comprising integrating computer-readable code into a computing system, wherein the code in combination with the computing system is capable of performing the following:
    selecting a plurality of categories in response to identifying a predefined user profile associated with a user, the user having a plurality of purchase items at a checkout station, the user profile comprising a plurality of predetermined categories, each predetermined category associated with one or more criterion for bagging purchase items, wherein identifying a predefined user profile associated with the user comprises receiving an identification from the user;
    identifying a purchase item based at least in part upon an identifier disposed on the purchase item;
    associating a selected category of the plurality of categories of the user profile with the purchase item using a criterion for bagging purchase items; and
    motivating the purchase item automatically to a specified bin of a plurality of bins at a checkout station wherein the specified bin is associated with the selected category.

13. The method of claim 12, wherein the method further comprises receiving a category selection, receiving a criterion selection for the category selection, receiving a modification for the criterion selection, and modifying the criterion of the selected category with the modification.

14. The method of claim 12, further comprising bagging one or more purchase items from a bin.

15. A system to sort purchase items, the system comprising:
    a scanner configured to scan an identifier of a purchase item disposed on the purchase item;
    a user terminal configured to interface with a user and receive payment;
    a controller comprising
        a selection module that selects a plurality of categories in response to identifying a predefined user profile associated with a user, the user having a plurality of purchase items at a checkout station, the user profile comprising a plurality of predetermined categories, each predetermined category associated with one or more criterion for bagging purchase items, wherein identifying a predefined user profile associated with the user comprises receiving an identification from the user;

an identification module that identifies the purchase item at least in part from the scanned identifier;

an association module that associates a selected category of the plurality of categories of the user profile with the purchase item using a criterion for bagging purchase items;

a plurality of bins configured at a checkout station to receive one or more purchase items; and an automatic sorter that motivates the purchase item to a specified bin of the plurality of bins wherein the specified bin is associated with the selected category.

16. The system of claim 15, wherein the plurality of bins are disposed radially about a pivot and wherein the sorter comprises a bin actuator configured to rotate the bins about the pivot to position the specified bin to receive the purchase item from the conveyer.

17. The system of claim 15, further comprising a bagger configured to bag one or more purchase items from a bin.

18. The system of claim 17, wherein the bagger positions an open bag to receive the purchase items.

19. The system of claim 17, wherein the bagger encompasses the one or more purchase items within a tube of a plastic material, thermally seals the tube in proximity to the purchase items between the purchase items and a distal end of the tube, and severs a portion of the tube encompassing the purchase item within the tube in proximity to the thermal seal and between the thermal seal and the distal end of the tube.

20. An apparatus to sort purchase items, the apparatus comprising:

means for selecting a plurality of categories in response to identifying a predefined user profile associated with a user, the user having a plurality of purchase items at a checkout station, the user profile comprising a plurality of predetermined categories, each predetermined category associated with one or more criterion for bagging purchase items, wherein identifying a predefined user profile associated with the user comprises receiving an identification from the user;

means for receiving a category selection;

means for receiving a criterion selection for the category selection;

means for receiving a modification for the criterion selection;

means for modifying the criterion of the selected category with the modification;

means for identifying a purchase item based at least in part upon an identifier disposed on the purchase item;

means for associating a selected category of the plurality of categories with the purchase item using a criterion for bagging purchase items; and means for motivating the purchase item automatically to a specified bin of a plurality of bins at a checkout station wherein the specified bin is associated with the selected category.

* * * * *